2,465,056
Patented Sept. 2, 1969

3,465,056
DIMERISATION PROCESS
James Keith Hambling, Aldershot, and John Robert Jones, Walton-on-Thames, England, assignors to The British Petroleum Company Limited, London, England, a corporation of Great Britain
No Drawing. Filed June 22, 1966, Ser. No. 559,399
Claims priority, application Great Britain, July 14, 1965, 29,831/65
Int. Cl. C07c 3/10
U.S. Cl. 260—683.15                    7 Claims

ABSTRACT OF THE DISCLOSURE

A process for the production of a product consisting predominantly of branched chain dimers having internal unsaturation and also containing linear dimers is provided which process comprises dimerising an alpha mono-olefin containing 3 or more carbon atoms per molecule in the presence of a catalyst comprising the reaction product of cobalt or nickel chloride and aluminium diethyl monochloride or aluminium triethyl, the reaction product being supported on an activated carbon support, at a temperature in the range −40° C. to +200° C. at a pressure in the range 200 to 2000 p.s.i.g.

---

This invention relates to a process for the production of dimers of alpha-olefins.

Processes for the dimerisation of alpha-olefins in the presence of aluminium alkyls, either as the sole catalytic entity or in combination with a minor proportion of an activator, are known.

British patent specification No. 713,081, Ziegler, discloses a process for the polymerisation of ethylene which comprises contacting ethylene at a temperature within the range 60–250° C. with an activator selected from hydrides of aluminium, gallium, indium and beryllium and derivatives of such hydrides in which one or more of the hydrogen atoms are substituted by hydrocarbon radicals selected from the group consisting of alkyl radicals and monovalent aromatic hydrocarbon radicals.

In particular, British patent specification No. 713,081 discloses the polymerisation of ethylene to butene-1 and higher linear alpha-olefins by contacting ethylene with aluminium triethyl at 200–220° C. under super-atmospheric pressure.

British patent specification No. 742,642, Ziegler, discloses a process for the dimerisation of a mono-olefin containing more than two carbon atoms in the molecule which comprises heating the mono-olefin at a temperature within the range 60–250° C. in the presence of an activator selected from the hydrides of beryllium, aluminium, gallium and indium and derivatives of such hydrides in which one or more of the hydrogen atoms are substituted by hydrocarbon radicals selected from the group consisting of alkyl radicals and mono-valent aromatic hydrocarbon radicals.

In particular British patent specification No. 742,642 discloses the dimerisation of propylene to a product consisting predominantly of 2-methylpentene-1 by contacting propylene with aluminium triethyl at temperatures in the range 180–240° C. under super-atmospheric pressure.

British patent specification No. 773,636, Ziegler, discloses a process for the catalytic polymerisation of ethylene to form butene, hexene or higher liquid or solid paraffin-like polymers or mixtures thereof in the presence of an aluminium trialkyl of general formula

wherein $R_1$, $R_2$ and $R_3$ represent similar or dissimilar alkyls, in which the aluminium trialkyl is activated by nickel, cobalt or platinum.

The advantage of the process described in British patent specification No. 773,536 with respect to prior art processes, e.g., as described in 713,081 is stated to lie in the fact that it can be effected at much lower temperatures.

One would therefore expect that the dimerisation of an alpha-olefin, for example propylene, in the presence of a catalyst comprising a reducing agent, for example an aluminium trialkyl and a nickel or cobalt compound, for example cobalt chloride, would result in the production of a product consisting predominantly of a branched chain olefin, for example 2-methylpentene-1, and that this process could be effected at lower temperatures than those disclosed in British patent specification No. 742,642.

We have previously discovered that dimerising an alpha-olefin containing 3 or more carbon atoms per molecule in the presence of a catalyst comprising a salt of a metal of Groups I–B or VIII of the Periodic Table according to Mendeleef and a reducing agent results in the production of a product which, while consisting predominantly of branched chain dimers having internal olefinic unsaturation, nevertheless contains a relatively high proportion of linear dimers compared with the product resulting from dimerisation of the same alpha-olefin in the presence of an aluminium trialkyl catalyst.

Our copending application Ser. No. 559,096, filed June 21, 1966, discloses a process for the production of a product consisting predominantly of branched chain dimers having internal unsaturation and linear dimers which process comprises dimerising an alpha-olefin containing 3 or more carbon atoms per molecule in the presence of a catalyst comprising the reaction product of a reducible salt of a metal of Group I–B or VIII of the Periodic Table according to Mendeleef and reducing agent, at a temperature in the range −40° C. to +200° C. under such conditions of pressure that the reactants are maintained in the liquid phase.

In general, it will be found that the salt will not react with the reducing compound at ambient temperature and that the composition will require heating before becoming catalytically active.

We have now discovered that the presence of activated carbon renders the composition catalytically active at lower temperatures.

Thus according to the present invention there is provided a process for the production of a product consisting predominantly of branched chain dimers having internal unsaturation and linear dimers which process comprises dimerising an alpha-olefin containing 3 or more carbon atoms per molecule in the presence of a catalyst comprising the reaction product of a reducible salt of a metal of Groups I–B or VIII of the Periodic Table according to Mendeleef and a reducing agent, the reaction product being supported on an activated carbon support, at a temperature in the range −40° C. to +200° C. under such conditions of pressure that the reactants are maintained in the liquid or partially condensed phase.

Preferred reducible salts include cobalt chloride and nickel chloride.

Suitable reducing agents include Grignard reagents, metal alkyls and similar organo-metallic compounds.

The preferred reducing agents are organo-aluminium compounds, in particular aluminium diethylmonochloride and aluminium triethyl.

Suitably the molar ratio of the salt to the reducing compound is in the range 2:1 to 1:10, preferably it is in the range 1.0:0.8 to 1:2.

Preferably the catalyst is prepared by impregnating activated carbon with an aqueou solution of the salt, drying the impregnated carbon and adding the reducing agent to the impregnated and dried material.

Preferably the salt/activated carbon component of the catalyst contains 5–30% by weight of the metallic constituent of the salt expressed as a percentage by weight of the component.

Preferably the pressure under which dimerisation is effected is in the range 200 to 2000 p.s.i.g.

Suitable alpha-olefins for dimerisation include those containing from 3 to 6 carbon atoms per molecule.

The preferred olefins for dimerisation include propylene and butene-1.

Dimerisation may, if desired, be effected in the presence of an inert diluent. Suitable diluents include normally liquid saturated hydrocarbons and halogenated hydrocarbons.

The catalyst must be preserved from contact with water, oxygen, alcohols, ethers, amines, phosphines, sulphur compounds, dienes, acetylenes, carbon monoxide and other complexing ligands which displace olefins from transition metal complexes. The presence of substantial quantities of these materials will destroy or reduce the efficiency of the catalyst.

The invention is illustrated with reference to the following example.

Steam activated coconut shell charcoal grade "Ultrasorb" SCII (supplied by Messrs. British Carbo Norit Union Limited) was washed with 10% v./v. nitric acid to reduce the ash content to about 0.9% by weight. The material was thoroughly washed with distilled water and was dried in nitrogen at 300° C. The charcoal was then immersed for half an hour in a solution of 3 parts by weight nickel chloride hexahydrate in 1 part of water. The solid was filtered off and heated in nitrogen to about 300° C. in half an hour. The resulting material contained 16.5 percent by weight of nickel expressed as percentage by weight of nickel metal of the total.

The nickel chloride-charcoal material (9.8 g.) was stirred in 25 g. n-heptane under an atmosphere of nitrogen and was cooled to 0° C. Aluminium triethyl (3.0 cc.) was added dropwise to the slurry during half an hour. The mixture was transferred under nitrogen to a 1 litre autoclave which was then pressured with liquid propylene at 60 0p.s.i. and 40° C. The autoclave was rocked for 16½ hours. The total reaction products were then collected in cooled traps (solid carbon dioxide-acetone). The excess propylene was allowed to evaporate slowly. The residual liquid weighed 213 g. Of this 176 g. distilled below 100° C. The distillate contained 8 g. n-heptane and 168 g. hexenes of which 25.0 percent was linear hexenes (mostly cis- and trans-hexene-2).

We claim:

1. A process for the production of a product consisting predominantly of branched chain dimers having internal unsaturation and also containing linear dimers which process comprises dimerising an alpha mono-olefin containing 3 or more carbon atoms per molecule in the presence of a catalyst comprising the reaction product of cobalt or nickel chloride and aluminium diethyl monochloride or aluminium triethyl, the reaction product being supported on an activated carbon support, at a temperature in the range −40° C. to +200° C. at a pressure in the range 200 to 2000 p.s.i.g.

2. A process according to claim 1 wherein the molar ratio of the cobalt or nickel chloride to the aluminium diethyl monochloride or the aluminium triethyl is in the range 2:1 to 1:10.

3. A process according to claim 2 wherein the ratio is in the range 1.0:0.8 to 1:2.

4. A process according to claim 1 wherein the catalyst is prepared by impregnating activated carbon with an aqueous solution of the cobalt or nickel chloride, drying the impregnated carbon and adding the aluminium diethyl monochloride or the aluminium triethyl to the impregnated and dried material.

5. A process according to claim 1 wherein the cobalt or nickel chloride activated carbon component of the catalyst contains 5–30% by weight of the metallic constituent, expressed as a percentage by weight of the component.

6. A process according to claim 1 wherein dimerisation is effected in the presence of an inert diluent.

7. A process according to claim 6 wherein the diluent is selected from the group consisting of a normally liquid saturated hydrocarbon and halogenated hydrocarbon.

References Cited

UNITED STATES PATENTS

| | | |
|---|---|---|
| 2,969,408 | 1/1961 | Nowlin et al. |
| 3,096,385 | 7/1963 | McConnell et al. |
| 3,316,321 | 4/1967 | Hoegl et al. |
| 3,321,546 | 5/1967 | Roest et al. |

PAUL M. COUGHLAN, Jr., Primary Examiner

U.S. Cl. X.R.

252—429